(12) United States Patent
Cherukumalli et al.

(10) Patent No.: US 11,490,609 B2
(45) Date of Patent: Nov. 8, 2022

(54) MOSQUITO IDENTIFICATION CLASSIFICATION TRAP AND METHOD TO USE

(71) Applicants: Satish K. Cherukumalli, Columbia, SC (US); Terry J. DeBriere, Jacksonville, FL (US); Ram Yakkanti, Lexington, SC (US); John DeBriere, Honolulu, HI (US)

(72) Inventors: Satish K. Cherukumalli, Columbia, SC (US); Terry J. DeBriere, Jacksonville, FL (US); Ram Yakkanti, Lexington, SC (US); John DeBriere, Honolulu, HI (US)

( * ) Notice: Subject to any disclaimer, the term of this patent is extended or adjusted under 35 U.S.C. 154(b) by 405 days.

(21) Appl. No.: 16/911,513

(22) Filed: Jun. 25, 2020

(65) Prior Publication Data

US 2021/0400943 A1  Dec. 30, 2021

(51) Int. Cl.
| | |
|---|---|
| *A01M 1/02* | (2006.01) |
| *A01M 1/06* | (2006.01) |
| *A01M 1/10* | (2006.01) |
| *A01M 1/12* | (2006.01) |
| *A01M 1/04* | (2006.01) |
| *H04R 1/02* | (2006.01) |
| *G01H 11/06* | (2006.01) |
| *G01H 9/00* | (2006.01) |

(52) U.S. Cl.
CPC ............ *A01M 1/026* (2013.01); *A01M 1/023* (2013.01); *A01M 1/06* (2013.01); *A01M 1/106* (2013.01); *A01M 1/12* (2013.01); *A01M 1/04* (2013.01); *A01M 2200/012* (2013.01); *G01H 9/00* (2013.01); *G01H 11/06* (2013.01); *H04R 1/028* (2013.01)

(58) Field of Classification Search
CPC .......... A01M 1/00; A01M 1/02; A01M 1/023; A01M 1/026; A01M 1/06; A01M 1/10; A01M 1/106; A01M 1/12
USPC ....................................... 43/139, 107, 132.1
See application file for complete search history.

(56) References Cited

U.S. PATENT DOCUMENTS

| | | | | |
|---|---|---|---|---|
| 783,752 | A * | 2/1905 | Marston | 43/139 |
| 959,155 | A * | 5/1910 | Lt | 43/139 |
| 1,029,972 | A * | 6/1912 | Britton | 43/139 |
| 1,071,620 | A * | 8/1913 | Kingsland | 43/107 |

(Continued)

FOREIGN PATENT DOCUMENTS

| | | | | |
|---|---|---|---|---|
| CA | 2814940 A1 * | 4/2012 | ............ | A01M 1/023 |
| EP | 3466256 A1 * | 4/2019 | ............ | A01M 1/023 |

(Continued)

*Primary Examiner* — Darren W Ark
(74) *Attorney, Agent, or Firm* — Lawrence J. Gibney, Jr.

(57) ABSTRACT

It is important to trap and identify mosquitos to ensure the safety of the population where mosquitos gather. The classification of a type of mosquito is typically accomplished by a unique wingbeat signature that is characteristic of different types of mosquitos. One of the goals of the trap is to quickly identify the mosquito and then quickly release the mosquito. This application will allow the user to obtain an approximate population so that the appropriate type and amount of insecticide can be applied to control the population to insure the health of the human and animal population while at the same time minimizing danger to the environment or surrounding ecosystem.

24 Claims, 4 Drawing Sheets

First Embodiment

(56) References Cited

U.S. PATENT DOCUMENTS

| | | | | |
|---|---|---|---|---|
| 1,148,910 A * | 8/1915 | Le Baron | | 43/132.1 |
| 1,885,854 A * | 11/1932 | Montellano | | A01M 1/08 43/139 |
| 2,236,698 A * | 4/1941 | Rector | | A01M 1/04 43/139 |
| 2,384,930 A * | 9/1945 | Kendrick | | A01M 1/08 43/139 |
| 2,694,879 A * | 11/1954 | Stoll | | A01M 1/02 43/139 |
| 3,750,327 A * | 8/1973 | Thybault | | A01M 1/06 43/139 |
| 4,275,523 A * | 6/1981 | Baima | | A01M 1/223 43/112 |
| 4,410,967 A * | 10/1983 | Hendricks | | G01S 15/88 367/87 |
| 4,411,094 A * | 10/1983 | Spackova | | A01M 1/026 43/111 |
| 4,625,453 A * | 12/1986 | Smith | | A01M 1/06 43/139 |
| 5,040,326 A * | 8/1991 | Van Dijnsen | | G08B 13/18 43/65 |
| 5,123,201 A * | 6/1992 | Reiter | | A01M 1/026 43/107 |
| 5,343,652 A * | 9/1994 | Johnson | | A01M 1/04 43/132.1 |
| 5,915,950 A * | 6/1999 | Kleinhenz | | A01M 1/023 43/107 |
| 5,926,997 A * | 7/1999 | Wilcox | | A01M 1/026 43/60 |
| 6,564,503 B1 * | 5/2003 | Miyahara | | A01M 1/223 43/112 |
| 6,568,125 B2 * | 5/2003 | Kleinhenz | | A01M 1/026 43/107 |
| 7,020,996 B2 * | 4/2006 | Beroza | | A01M 1/026 43/132.1 |
| 7,071,829 B2 * | 7/2006 | Gardner, Jr | | A01M 31/002 250/221 |
| 7,218,234 B2 * | 5/2007 | Tirkel | | A01M 1/026 340/552 |
| 7,317,399 B2 * | 1/2008 | Chyun | | A01M 1/026 43/132.1 |
| 7,496,228 B2 * | 2/2009 | Landwehr | | G06V 10/46 382/165 |
| 7,511,624 B2 | 3/2009 | Shaw | | |
| 7,656,300 B2 * | 2/2010 | Ronnau | | H04M 11/002 340/567 |
| 7,774,976 B2 | 8/2010 | Geier | | |
| 7,779,575 B2 * | 8/2010 | Hirafuji | | A01M 1/026 43/112 |
| 7,980,200 B2 * | 7/2011 | Troutman | | A01K 13/002 119/6.5 |
| 8,701,338 B1 * | 4/2014 | Walsh, Jr. | | A01M 23/12 43/139 |
| 8,705,017 B2 * | 4/2014 | Hyde | | A01M 1/026 356/28 |
| 8,896,452 B2 * | 11/2014 | Oppenheimer | | A01M 1/026 340/573.2 |
| 8,943,742 B2 * | 2/2015 | Aiayedh | | A01M 1/106 43/107 |
| 9,192,165 B2 * | 11/2015 | Rose | | C01B 32/50 |
| 9,335,413 B2 * | 5/2016 | Weber-Grabau | | A01K 11/006 |
| 9,585,376 B2 * | 3/2017 | Park | | A01N 61/00 |
| 9,664,813 B2 * | 5/2017 | Janét | | G01V 8/12 |
| 9,807,346 B2 * | 10/2017 | Afanasyev | | H04N 7/18 |
| 9,852,362 B2 * | 12/2017 | Fryshman | | G06K 9/6267 |
| 9,915,732 B2 * | 3/2018 | Weber-Grabau | | G01S 17/04 |
| 9,946,922 B2 * | 4/2018 | Hyde | | A01M 1/106 |
| 9,999,211 B2 * | 6/2018 | Janét | | A01M 1/026 |
| 9,999,212 B2 * | 6/2018 | Janét | | A01M 1/04 |
| 10,021,870 B2 * | 7/2018 | Wang | | F21V 23/001 |
| 10,157,468 B2 * | 12/2018 | Kumeno | | G06T 7/11 |
| 10,178,856 B2 * | 1/2019 | Mafra-Neto | | G01V 8/20 |
| 10,178,857 B2 * | 1/2019 | Massaro | | A01M 1/103 |
| 10,271,533 B2 * | 4/2019 | Maxik | | A01M 1/106 |
| 10,271,535 B2 * | 4/2019 | Lillamand | | A01M 1/06 |
| 10,375,947 B2 * | 8/2019 | Liu | | G06V 10/145 |
| 10,925,274 B2 * | 2/2021 | Cherukumalli | | A01M 1/106 |
| 10,966,420 B2 * | 4/2021 | Ching | | A01M 1/10 |
| 11,304,414 B2 * | 4/2022 | Chang | | A01M 1/04 |
| 2007/0169401 A1 * | 7/2007 | Chyun | | A01M 1/145 43/107 |
| 2013/0162443 A1 * | 6/2013 | Oppenheimer | | A01M 1/12 340/870.03 |
| 2014/0250767 A1 * | 9/2014 | Heugle | | A01M 1/026 43/129 |
| 2015/0085100 A1 * | 3/2015 | Raschella | | A01K 61/90 348/82 |
| 2016/0212984 A1 * | 7/2016 | Fang | | A01M 1/023 |
| 2016/0245916 A1 * | 8/2016 | Weber-Grabau | | H01J 37/32917 |
| 2017/0273291 A1 * | 9/2017 | Yoo | | G06V 40/10 |
| 2017/0290318 A1 * | 10/2017 | Bergengren | | A01M 1/08 |
| 2018/0092344 A1 * | 4/2018 | Tyler | | A01M 1/08 |
| 2018/0093288 A1 * | 4/2018 | Tillotson | | A01M 1/026 |
| 2018/0125052 A1 * | 5/2018 | Johnson | | A01M 1/023 |
| 2018/0177175 A1 * | 6/2018 | Tsai | | A01M 1/20 |
| 2018/0206472 A1 * | 7/2018 | Maxik | | A01M 1/06 |
| 2018/0213765 A1 * | 8/2018 | Liang | | A01M 1/02 |
| 2018/0279598 A1 * | 10/2018 | Hur | | A01M 1/106 |
| 2018/0303079 A1 * | 10/2018 | Marka | | A01M 1/026 |
| 2019/0000059 A1 * | 1/2019 | Marka | | A01M 31/002 |
| 2019/0034736 A1 * | 1/2019 | Bisberg | | G06V 10/56 |
| 2019/0110458 A1 * | 4/2019 | Liu | | A01M 1/026 |
| 2019/0121302 A1 * | 4/2019 | Reid | | G05B 13/0275 |
| 2019/0187281 A1 * | 6/2019 | Weber-Grabau | | A01M 1/08 |
| 2019/0302265 A1 * | 10/2019 | Jansson | | A01K 29/00 |
| 2019/0327951 A1 * | 10/2019 | Selvig | | A01M 1/145 |
| 2020/0229420 A1 * | 7/2020 | Ben Hamozeg | | G01G 19/42 |
| 2020/0245604 A1 * | 8/2020 | CHerukumalli | | A01M 1/106 |
| 2020/0367483 A1 * | 11/2020 | Geier | | G01N 21/6428 |
| 2020/0396975 A1 * | 12/2020 | Furuta | | A01M 1/223 |
| 2020/0404897 A1 * | 12/2020 | Lillamand | | A01M 1/08 |
| 2021/0007342 A1 * | 1/2021 | Hinsch | | G01J 1/0403 |
| 2022/0101015 A1 * | 3/2022 | Goodwin | | G06V 10/24 |
| 2022/0104474 A1 * | 4/2022 | Chellappan | | A01M 1/026 |
| 2022/0217962 A1 * | 7/2022 | Romanova | | A01M 1/106 |

FOREIGN PATENT DOCUMENTS

| | | | | |
|---|---|---|---|---|
| EP | 3682737 A1 * | 7/2020 | | A01M 1/026 |
| EP | 4039089 A1 * | 8/2022 | | |
| JP | 11155458 A * | 6/1999 | | |
| JP | 2003052293 A * | 2/2003 | | |
| JP | 2011004657 A * | 1/2011 | | |
| KR | 20100054331 A * | 5/2010 | | |
| KR | 20100067827 A * | 6/2010 | | |
| KR | 101004754 B1 * | 1/2011 | | |
| KR | 101224706 B1 * | 1/2013 | | |
| KR | 101229487 B1 * | 2/2013 | | |
| KR | 20130081553 A * | 7/2013 | | |
| KR | 101507554 B1 * | 4/2015 | | |
| WO | WO-2006059059 A1 * | 6/2006 | | A01M 1/026 |
| WO | WO-2014037936 A1 * | 3/2014 | | A01M 1/02 |
| WO | WO-2015177382 A1 * | 11/2015 | | A01M 1/023 |
| WO | WO-2016093673 A1 * | 6/2016 | | A01M 1/00 |
| WO | WO-2017165517 A1 * | 9/2017 | | A01M 1/023 |
| WO | WO-2017213531 A1 * | 12/2017 | | A01M 1/023 |
| WO | WO-2018136929 A1 * | 7/2018 | | A01M 1/023 |
| WO | WO-2019020694 A1 * | 1/2019 | | A01K 11/00 |
| WO | WO-2019079248 A1 * | 4/2019 | | A01M 1/026 |
| WO | WO-2020058175 A1 * | 3/2020 | | A01M 1/026 |
| WO | WO-2020058982 A1 * | 3/2020 | | A01K 29/00 |
| WO | WO-2020161749 A1 * | 8/2020 | | |
| WO | WO-2020206089 A1 * | 10/2020 | | A01M 1/026 |

* cited by examiner

First Embodiment

Second Embodiment

MOSQUITO IDENTIFICATION CLASSIFICATION TRAP AND METHOD TO USE

RELATED APPLICATIONS

This is a continuation in part application and the applicant claims the benefits of the filing date under 35 U.S.C. § 119(e) of Non-Provisional patent application Ser. No. 15/676,046 filed on Aug. 14, 2017.

FIELD OF THE INVENTION

This relates to tracking mosquitos for the purpose of identifying particular types of mosquitoes to apply insecticide and pesticides in order to control the population of certain species of mosquitoes. Certain types of mosquitoes carry diseases, such as malaria and the Zika virus to name a few. These diseases can wreak tragic results for humans. However, not all mosquitoes carry the Malaria or Zika viruses and it is important to maintain the appropriate balance between the "good" mosquito that is a food source and the mosquito that carries infectious disease. While it is important to eradicate the type of mosquitoes that carry harmful diseases, damage to the environment and the food supply should be minimized.

According to National Vector Borne Disease Control Program, Malaria is a public health problem in several parts of India. About 95% population in the country resides in malaria endemic areas. According to the 2015 World Health Organization Malaria Report, 214 million cases of malaria occurred world-wide, leading to 438,000 deaths. It is estimated that roughly 5% of these cases occurred in India (10.7 million cases/21,900 deaths).

Increasing human activities, such as urbanization, industrialization and construction projects with consequent migration, deficient water and solid waste management and indiscriminate disposal of articles (tires, containers, junk materials, cups, etc.) create conditions favorable for mosquito growth and thus contribute to the spread of vector borne diseases.

According to the estimates of a 16-member committee set up by the National Vector Borne Disease Control Programme (NVBDCP) to assess India's actual malaria death burden, the total annual number of cases in India may be about 9.7 million, with about 30,014-48,660 deaths (40,297 on an average).

Other mosquito-borne diseases like Dengue Fever, Chikungunya, Filariasis, Japanese Encephalitis and now the Zika Virus pose a heavy socio-economic burden on developing countries like India. For example, India is home to 34% of world-wide Dengue infections.

Local and central governments have traditionally tackled the mosquito menace with curative solutions, such as spraying of insecticides and larvicides. However, over time this has led to increasing resistance among mosquitoes and also negatively impacts vulnerable sections of the population like infants, the elderly and pregnant women.

As a result, there is major interest in development and application of preventive solutions to the problem of mosquito-borne diseases. The above facts provide clear evidence of the need for better control methodologies to aide in the reduction of mosquito populations. To this end, we endeavor to implement a new, affordable mosquito sensor system that would operate autonomously, and use state-of-the-art IOT technology to alert health and human services agencies of the need to target for treatment specific geographic areas, in an effort to control the mosquito populations responsible for the spread of vector-borne diseases.

A combination of improved insect population control and improved medical treatment services could have a significant socio-economic impact on the lives of millions of people.

PRIOR ART

There are many prior art references to the study of mosquitos. A representative example of a prior art reference that teaches an insect trap is found at Geier U.S. Pat. No. 7,774,976. This reference is representative of the traps that can be found in the prior art but it does not teach a way to classify the mosquito in real time. The ability to identify the mosquito in real time is important for classification purposes and for eradication efforts.

Another reference that teaches the detection of objects with a technique of scattering light is found at Shaw, U.S. Pat. No. 7,511,624. While this reference does not specifically deal with insects or mosquitos it does teach one of the tools that are used to identify the mosquito.

The Rose U.S. Pat. No. 9,192,165 teaches a method to attract a blood-sucking arthropod, which is a group of invertebrates including the mosquito.

While some of the features of this device are taught, none of the prior art teaches all the features that are taught in this particular application. A critical difference between the prior art references and this application is that this application is designed to identify changes in the population of a specific type of mosquito, in a specific location, in real time, so that appropriate insecticide can be applied judiciously to reduce the population while minimizing the adverse effects on the environment.

BRIEF SUMMARY OF THE INVENTION

This is a mosquito trap that will be placed in various locations either around population centers or in remote areas. The purpose of the trap is to lure the mosquito into the trap, identify the mosquito and then evacuate the mosquito into a catch bag.

Certain characteristics are known about mosquitoes and the trap has been designed with those behavioral tendencies and characteristics in mind. It has been long known, since 1945 that the frequency of a mosquito's wingbeat strongly correlates with its species. Wingbeat frequency classification has been researched extensively over the last 70 years. The maturation of artificial learning and computerized classification algorithms have made real time automated classification possible.

The wingbeat frequency spectrum, although a primary means of electronically identifying a mosquito species, is not always enough. The Aedes and the Culex mosquito wingbeat, for example, have significant overlap. As a result, wingbeat frequency alone is not as accurate as needed. It is well known that certain types of mosquito will tend to fly at dusk and others will fly at midday. Another differentiating characteristic is that different species of mosquitoes will fly at different heights from the ground than others.

This sensor system uses of the above described characteristics and others to increase the accuracy of autonomously classifying mosquitoes. It makes use of the time of intercept and weights classification on the basis of the known differences in circadian rhythm. It is known for instance that the circadian rhythm for the Aedes mosquito is different from the anopheles mosquito. If the time of intercept is in the morning, the Aedes Aegyptus may be distinguished from the Culex. In the evening however, the Culex pippin and the Aedes detritus are both active so additional characteristics must be considered as parameters in the classification algorithm. One such parameter is based on keeping and using the historical data for a location. Location of intercept initially is based on what is known about the types of mosquitoes in the area as well as postmortem verification of the classification's accuracy. This trap is designed, as most others are, to keep the mosquitoes that have passed through it in a catch bag. The catch bag can then be periodically collected and a manual count of species can be compared with the computerized species count. In this way, as data is collected from an area or even a sensor location, the accuracy of localized species count can be increased and the historical probabilities can be included in the classification algorithm.

By combining the frequency spectrum, the time of intercept, height of flight, location geography and the location history, the probabilities are further increased beyond 95% accuracy. In the example of the overlap in the wingbeat frequency of the Aedes and Culex, adding in the other factors can shift the weighting of the given to the frequency. The addition of the locations geography, for example, is an urban area around buildings as opposed to a wooded area in a park, a weight would favor the species being Culex. Terrain and geographic area information is also added to the traps' microcontroller at the time the trap is placed and activated.

The trap will consist of two inlet pipes or channels with entrances set at different heights off the ground. At each entrance there are lures such as a warm light, or an odor, to attract the mosquito. As the mosquito approaches the entrance, a fan placed in the device will create a small vacuum to assist the mosquito into the entrance and down the respective channel into the body of the trap.

As the mosquito enters one of the exterior channels (first or second), it will pass by a corresponding photo detector. The exterior channels' photo detector captures whether the mosquito entered lower or the higher entrance, which is indicative of the height the mosquito was flying. Ideally, there is a distance of approximately one to one and one-half meters between the openings for the two exterior channels into which the mosquito will fly.

The interior channel will lead to a signature sensing chamber where the mosquito will be identified by its unique wing beat, using both light and/or sound. It is preferable that the number of mosquitoes that enter the signature sensing chamber be kept relatively low so that accurate identification can occur. Ideally the number would be between 1 and 3 mosquitoes.

A light emitter and a light detector array are placed within the signature sensing chamber. The light emitter will provide a stream of light that will be broken as the mosquito enters the signature sensing chamber. As the mosquito moves within the chamber its wingbeat signature is detected and the mosquito can be identified in this fashion.

There are several ways that a wingbeat signature can be determined. This trap uses either sound waves or light interference produced waves or both. In one embodiment, microphones are used in place of the light detectors and in another embodiment both microphones and light detectors may be used.

Once the mosquito enters the signature sensing chamber, the fan creating the vacuum to pull them in will stop. The fan must stop because the mosquito tends to not fly in wind and the mosquito needs to fly in order to capture its wingbeat for identification.

The application will have two different embodiments. In the first embodiment the signature sensing chamber rotates to open different ports. In the second embodiment the signature sensing chamber does not rotate, but rather the port doors open or close as the mosquito or mosquitos travel through the chamber.

In order to achieve its purpose, there must be a continuous sampling of the mosquitos by this device. Once the mosquito is in the chamber and the airflow from the fan has stopped, an irritant is applied to motivate the mosquito to fly. Once the mosquito is in flight and the wingbeat is captured, the exhaust port is opened; the irritant is again applied, and the fan is turned on to evacuate the mosquito from the sensing chamber and finally into a catch bag. An irritant can consist of a physical irritant such as something nudging or brushing against the mosquito gently; a heat source; or a vibration which is either through an ultrasonic means or a vibrating motor to motivate the mosquito to fly.

A screen is placed on the exit in the signature sensing chamber to initially trap the mosquito within the chamber for identification purposes. After capturing the wingbeat, the exhaust port is opened by opening the screen door or rotating the chamber to the open port position providing a way to evacuate the mosquito into the catch bag. A photo detector at the exit port, is used to indicate when the mosquito has been evacuated and as a signal to start the sequence to bring in the next mosquito.

The entire sequence begins with the mosquito entering one of the channels, then being detected by the channel photo detector, then obtaining the wingbeat frequency, then detecting that the mosquito has been evacuated takes between 5 to 15 seconds. The next cycle does not begin until after the exit port photo detector indicates the mosquito has been evacuated. Finally, the next cycle is started by closing the exit port screen or rotating the chamber back to the screened port and the fan is then started to bring in the next mosquito.

A controller will control the operation of the components of the trap including the operation of the access points and exit points for the mosquito. The controller will also detect the wingbeat frequency of the mosquito through a plurality of microphones and/or light diffraction when the mosquito is in the sensing chamber. The controller will operate a fan that will be turned on to guide the mosquito into the trap and then turn the fan off while it is being classified. Once the mosquito is classified, the controller will then turn the fan on to move the mosquito out of the sensing chamber and exit the trap. Once the controller has gathered the necessary information regarding the classification of the mosquito the controller also operates an irritant such as a beater arm or heat and open a door to allow the mosquito from the trap. The controller will gather all the data from the trap and transmit the data to a remote location for further analysis.

The device will be secured to buildings or lamp posts or other permanent structures or may be attached to trees if the trap is to be used in parks or more remote locations.

While it is important to trap the mosquito, it is also important to obtain an approximate population for particular types of mosquitoes. This extrapolation of the population is important for the purpose of applying insecticide of both the appropriate type(s) as well as the proper amounts so not to endanger other types of life or damage the environment.

In summary, the mosquito must fly through the sensor to be identified by the sensor. The sensor package is designed to attract various types of mosquitoes. The attractants will be chosen for the specific types of mosquitoes expected at the installed location. It is expected that a given location will have more than one type of mosquito. The present invention entrance is modular so that we can use any combination of attractants such as light, warmth, CO2, water and contrasting colors.

NUMBERING REFERENCES

Figure 1:
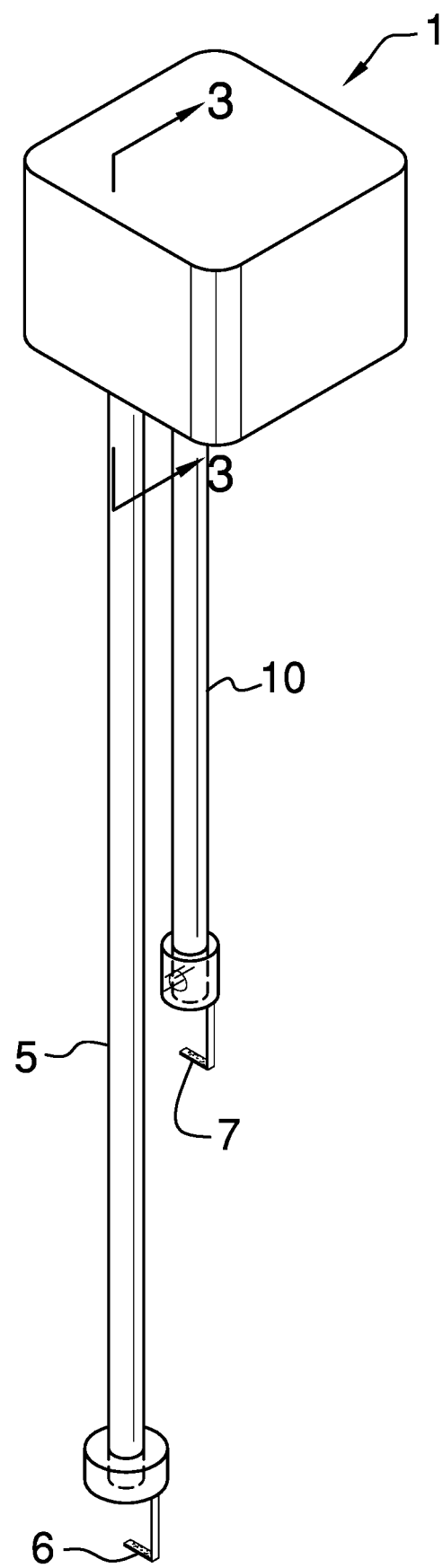
FIG. 1 is an isometric view of the mosquito trap.
Figure 2:
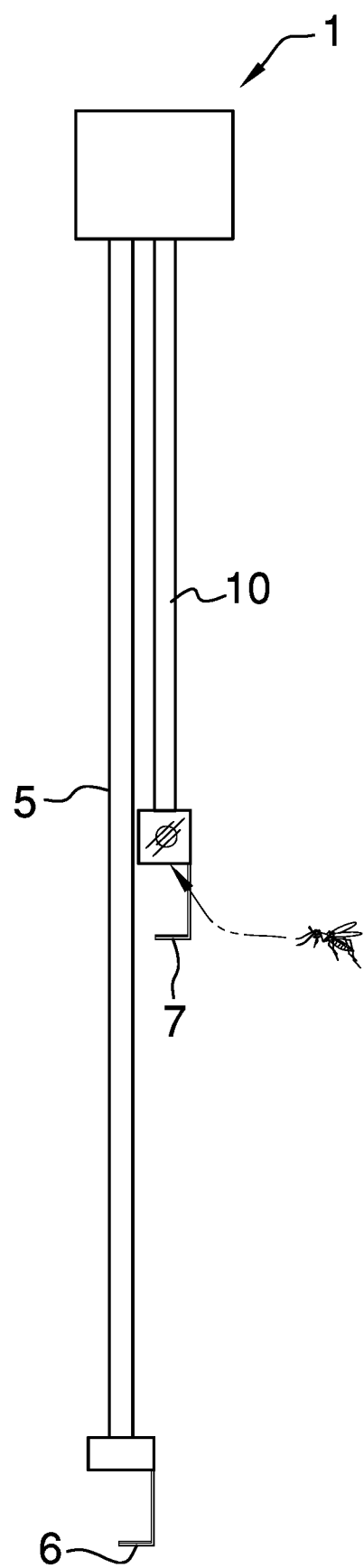
FIG. 2 is a side view of the mosquito trap.

1 Trap
5 First Channel—Longer
6 Attractant at entrance of first channel
7 Attractant at entrance of second channel
10 Second Channel—Shorter
15 Entrance detector for the first channel
16 Entrance detector for the second channel
20 Interior channel to signature sensing chamber
21 Entrance Door (Second Embodiment)
26 Intake Air Screen
30 Signature sensing chamber
35 Light emitter
36 Exit detector
40 Light detector
45 Rotatable Screen (Second embodiment)
50 Fan
55 Exit from signature sensing chamber (First embodiment)
57 Catch Bag
60 Exit Air inlet
70 Microphone
71 Chamber screen (First embodiment)
72 Microphone Screen (Second embodiment)
73 Microphone Screen (First embodiment)
74 Beater arms (First embodiment)
75 Beater arms (Second embodiment)
80 Air intake (First embodiment).

DETAILED DESCRIPTION OF THE EMBODIMENTS

This is a mosquito trap 1. The mosquito trap will consist of two exterior channels, a first channel 5 and a second channel 10 that are attached to an enclosed trap structure and will extend vertically down from the trap; the first channel 5 is longer than the second channel 10. The internal structure houses the internal components.

The channels, 5 and 10, will be circular structures with openings on the ends enable a mosquito to travel up through the channel and into the enclosed structure of the trap. The channels are different lengths to target different types of mosquitoes. These traps will be attached to permanent structures such as buildings, light posts, poles in and around the community depending on the desires of the user.

In order to attract different types of mosquitoes, sometimes bait or attractant is used at the end of the opening of the first or second channel 5 or 10 and this lures certain types of mosquitos which are attracted by certain bait to enter the first channel 5 or the second channel 10. The use of bait or attractant that are depicted as numbers 6 and 7 is well known in the prior art and no specific attractant is being claimed. Common examples of attractant 6, 7 include carbon dioxide ($CO_2$), heat, odors, and light. In the field a $CO_2$ cannister is placed near the proximity of the trap to slowly leak the gas into the area. In another example a mixture of oak leaves is placed in a pool of water near the opening of the respective channels so that the mixture will emit an odor that attracts mosquitoes. These are just two examples of the different types of attractants. A particular attractant may be used depending on the type of mosquito that needs to be studied but other attractants include light and heat.

The purpose of this device is to trap, identify and then force the mosquito out of the signature sensing chamber and into a catch bag. This is done primarily to determine changes in the population of mosquitoes in order to provide information to assist in population control of the mosquito and to identify those mosquitoes that are harmful to humans so that appropriate vector control method(s) such as the use of an insecticide or larvicides or sterile males can be appropriately applied.

A challenge is to be able to appropriately identify the mosquito as it travels through the trap. In any given environment there will likely be multiple types of mosquitos and this is anticipated by this application. Regardless of the type of mosquito, the mosquito must fly through one of the channels, 5 or 10, to be identified by the sensor. The sensor package that is part of this application is designed to attract various types of mosquitoes through the use of attractants, which is placed near the entrance of the respective channels, 5 and 10. The attractants will be chosen for the specific types of mosquitoes expected at the installed location. The trap is modular so that the user can use any combination of attractants such as light, warmth, CO2, water and contrasting colors, which is placed proximate to the entrance to the first channel 5 or second channel 10. In one example a CO2 cannister is placed near the proximity of the opening in the channel and the gas from the cannister is leaked into the area.

The mosquito will enter through the opening of either the first channel 5 or the second channel 10. The differences in the length of these channels reflect that certain types of mosquitos will fly at different heights. Ideally the difference in length of the channels is between one and one and one-half meters.

Entrance detectors, 15 and 16, will be placed in the first and second channel, 5 and 10, to alert the user of this device to the presence of a mosquito.

A fan 50 that is encased in the trap will create a slight vacuum to help the mosquito to travel within either the first or second channel past a photo detector 15, 16 in the respective first or second channel, and into an interior channel 20 that will lead the mosquito into the signature sensing chamber 30. The purpose of the entrance detector 15 or 16 is not to identify the type of mosquito but to indicate at what height the mosquito was flying when it entered the trap; this will provide the classification algorithm one parameter to use as a clue as to the possible type of mosquito that is entering the trap. The fan 50 within the trap will create a slight vacuum to assist the mosquito through the channel 20 and into the trap.

The mosquito will then enter the signature sensing chamber 30; an ideal number of mosquitos for identification purposes within the signature sensing chamber 30 are between one and three. If there are too many mosquitos in the signature sensing chamber 30, the appropriate identification of the mosquito will be difficult if not impossible. If more than three mosquitoes enter the signature sensing chamber 30 during one cycle, all mosquitoes will be evacuated from the signature sensing chamber 30 and they will be counted and classified as "undetermined species".

While in the signature sensing chamber 30, the mosquito will be identified through its wingbeat frequency using sound and/or light wave interference.

A plurality of microphones 70 are placed within the signature sensing chamber to assist in the elimination of ambient background noise (people, cars, electrical transmitted noise and well as electrically induced noise) as well as detect the noise from the mosquito's wingbeat frequency. Ideally three microphones are used to obtain the most accurate information related to the noise signature of a particular mosquito. For the vast majority of mosquitos a range of 300-850 hertz from the wing beat frequency is produced.

Light waves in the signature sensing chamber 30 are produced using the light emitters 35 and corresponding light detectors 40 that are placed directly across from the light emitters and are placed on the inner perimeter of the signature sensing chamber 30. As the mosquito enters the signature sensing chamber 30, the mosquito wingbeat will break the light beam repeatedly and this will provide the necessary information to determine its wingbeat frequency for identification. In order to increase the accuracy of the wingbeat frequency measurements, the light from the emitters may shine directly onto the detectors or may shine onto a light guide (not depicted) that directs the light to a single row of detectors. Additionally, polarized lenses may also be used. The use of light guides, diffusers and polarized lenses is well known in the prior art but not in connection with this type of application.

Another challenge is to force the mosquito to fly within the signature sensing chamber 30. If the mosquito is not flying, the wingbeat frequency cannot be detected. In order to encourage the mosquito to fly within the signature sensing chamber 30 an irritant is typically applied. The irritant is again used immediately prior to turning on the fan for the evacuation cycle because it is easier to evacuate a mosquito that is in the air rather than hanging on to a surface. The irritant may include a physical device such as beater arms 74, 75 that will brush against the mosquito without harming it, a heat source, noise or vibration.

This irritant will motivate the mosquito to fly and therefore be identified through the wingbeat frequency but also assist in the evacuation of the mosquito from the trap. A micro-controller (not depicted) will control the operation of the components of the device including rotating the chamber (first embodiment) or opening port doors and the cycling of the fan as well as measuring the wingbeat frequency of the mosquito. The mosquito enters the trap through either channel 5 or 10 and pass between a pair of entrance detectors, 15,16. The information that a mosquito has entered a channel and passed by a photo detector will be relayed to the micro-controller as the mosquito enters the signature sensing chamber 30. As the mosquito flies within the signature sensing chamber 30 a plurality of microphones 70 will detect the wingbeat frequency of the mosquito and that information is gathered by the micro-controller. Additionally, the micro-controller also detects the wingbeat frequency of the mosquito as the mosquito disrupts the stream of light between the light emitter 35 and the light detector 40. After the micro-controller has gathered the information necessary to identify the mosquito the micro-controller will apply an irritant to force the mosquito to exit from the signature sensing chamber 30; this irritant may be a beater arm 75. At the same time the micro-controller opens a rotatable door (second embodiment) to allow the mosquito to exit the signature sensing chamber. The micro-controller will collect, store, all relevant data including the wingbeat frequency, the entrance level and the time of day in stored memory and then transfer it to a server; the micro-controller will also operate the fan and the microphone, the operation of the detection devices and the operation of all the other components of the trap.

Several screens have been placed on this device. An intake air screen 26 is placed on the air intake, 60 and 80, to ensure that foreign bodies or other insects do not enter the trap. Microphone screens, 72 and 73, have also been placed over the microphones to protect the microphones within the signature sensing chamber 30.

A rotatable screen 45 and chamber screen 71 initially trap the mosquito within the signature sensing chamber 30, and allow the free flow of air throughout the trap. As the mosquito exits, the fan 50 is turned on to again to produce the slight vacuum within the channels, 5 and 10, and also motivate the mosquito to leave the trap to be collected in the bag 57.

It is anticipated that the cycle to bring a mosquito in, identify it within the signature sensing chamber 30 and then have the mosquito exit the trap is between 5 and 15 seconds.

It is anticipated that there will be two different embodiments of this device. Regardless of which version will be used, both will operate to trap, classify and then release the mosquito. The differences between the embodiments will focus on the manner in which the mosquito is led into and out of the signature sensing chamber.

Figure 3:
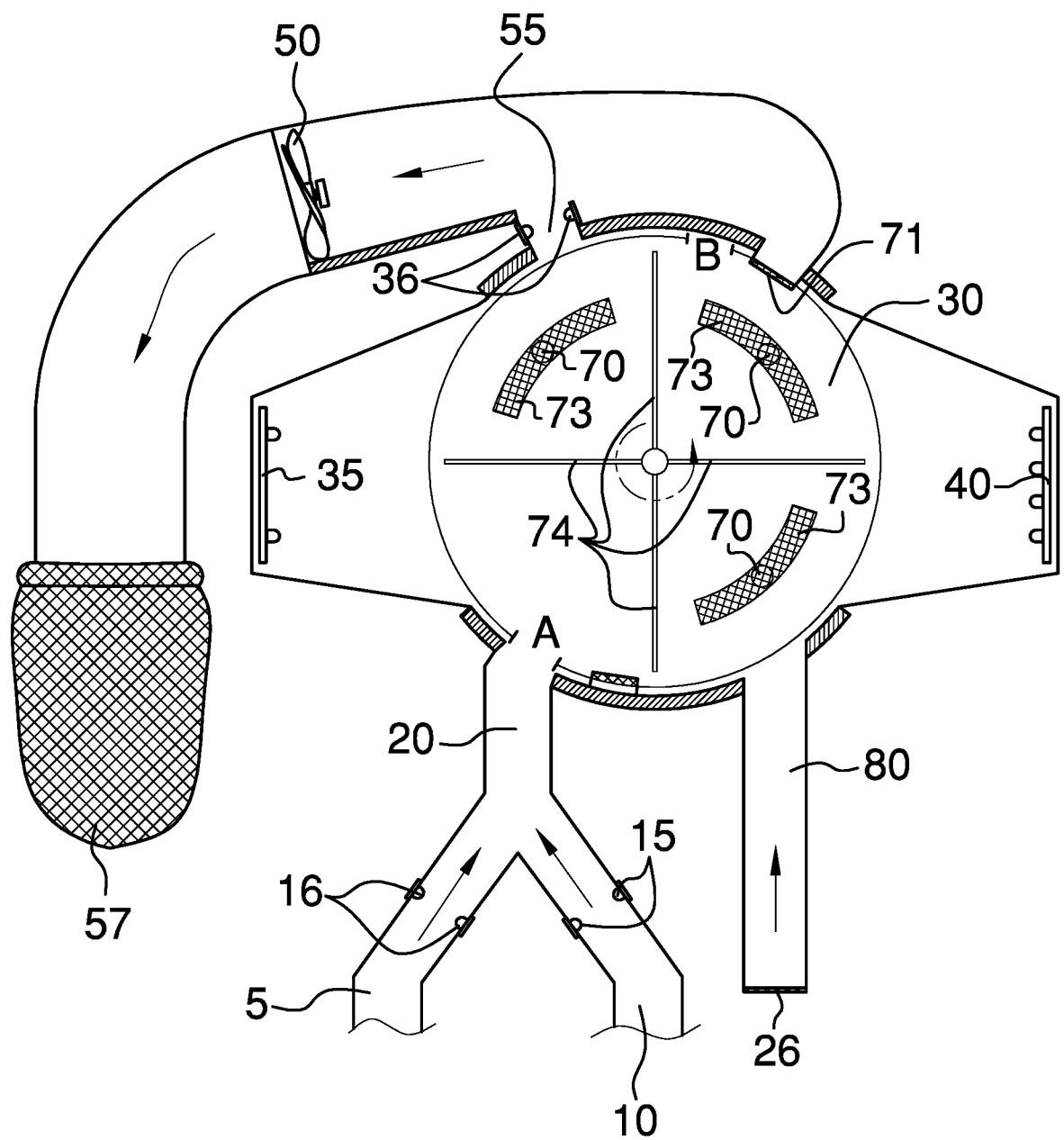
FIG. 3 is a cross-sectional view of the mosquito trap according to line 3-3 on FIG. 1 showing the internal components in the first embodiment.

First Embodiment—FIG. 3

In the first embodiment the signature sensing chamber 30 openings A and B will be provided on the interior perimeter of the signature sensing chamber such as depicted in FIG. 3. Once the mosquito enters the signature sensing chamber 30 through the interior channel 20 and through the opening A, the signature sensing chamber 30 will rotate approximately twenty to thirty degrees to prevent the mosquito from leaving the trap and trap the mosquito within the signature sensing chamber 30 during the identification process. The chamber screen 71 will insure that the air flow through the trap is free of particulates in order to insure that the interior components of the device are not affected.

At all times during the rotation of the signature sensing chamber 30 the microphones 70 are protected by the screen 73 to collect information from the wingbeat frequency sound waves that are produced by the mosquito.

Once the signature sensing chamber 30 is rotated initially and prevents the mosquito from leaving the trap the mosquito is identified by its wingbeat frequency both by light interruption and/or noise recognition (sound wave) techniques. Once the mosquito has been identified, the signature sensing chamber 30 will rotate an additional twenty to thirty degrees to align the opening B with the exit 55 and past the exit detector 36. Once the mosquito has left the trap, the signature sensing chamber 30 will rotate back to the original starting point so that the passage A is aligned with the interior channel 20 for the cycle to begin again.

Figure 4:
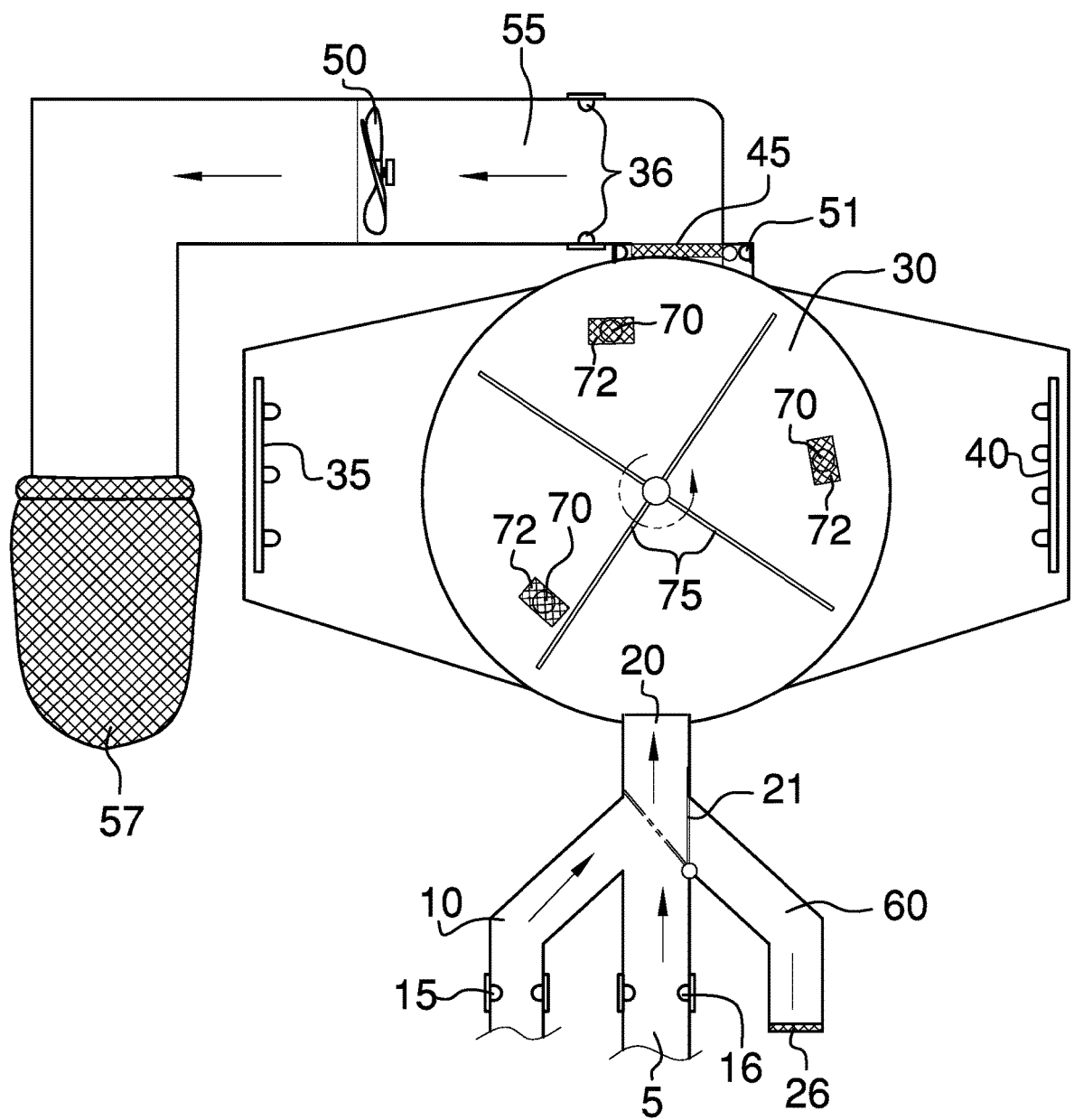
FIG. 4 is a cross-sectional view of the mosquito trap according to line 3-3 on FIG. 1 showing the internal components in the second embodiment.

Second Embodiment—FIG. 4

In the second embodiment, which is depicted by FIG. 4, the mosquito gains access to the signature sensing chamber 30 through an entrance door 21 that will open and close and allow the mosquito to travel through the interior channel 20. In the second embodiment, the signature sensing chamber 30 will not rotate but instead the door 21 will allow the mosquito to travel into the signature sensing chamber 30 but will close to prevent the mosquito from leaving the signature sensing chamber 30. Once the mosquito has been identified a rotating screen door 45 will open and the mosquito will leave the signature sensing chamber 30 and exit the trap through the exit 55 and past the exit detector 36 and into the catch bag 57.

Once the mosquito has left the signature sensing chamber 30, the entrance door 21 will rotate to allow another mosquito to enter the signature sensing chamber 30.

While certain modifications made by made by those skilled in the art, any modifications to the invention will not depart from the spirit of the invention.

The inventors claim:

1. A mosquito trap which is comprised of:
   a. an enclosed structure with a bottom;
   b. an attractant;
   c. a first channel;
      wherein the first channel extends a predetermined length from the bottom of the enclosed structure;
      wherein an opening is provided on an end of the first channel;
   d. a second channel;
      wherein the second channel extends a predetermined length from the bottom of the enclosed structure;
      wherein an opening is provided on an end of the second channel;
   e. an entrance detector for the first channel;
   f. an entrance detector for the second channel;
   g. an interior channel;
      wherein the interior channel permits passage of a mosquito into the enclosed structure from at least one of the first channel and the second channel;
   h. a signature sensing chamber;
      wherein the signature sensing chamber is located within the enclosed structure;
      wherein the signature sensing chamber has a predetermined shape;
      wherein the signature sensing chamber is rotatable;
      wherein a pair of openings are provided on a perimeter of the signature sensing chamber;
   i. a plurality of light emitters;
      wherein the plurality of light emitters are affixed to an inner perimeter of the signature sensing chamber;
   j. a plurality of light detectors;
      wherein the plurality of light detectors are affixed to the inner perimeter of the signature sensing chamber;
      wherein the plurality of light detectors are located directly across from the plurality of light emitters;
   k. a light guide or a diffuser;
      wherein the light guide or diffuser is located within the signature sensing chamber:
      wherein the light from the light emitters are passed through the light guide or the diffuser;
      wherein the light guide or the diffuser directs the light onto the plurality of light detectors;
      wherein the plurality of light detectors detect a wing beat frequency of a mosquito;
   l. a plurality of microphones;
      wherein the plurality of microphones detect the wing beat frequency of a mosquito;
      wherein the plurality of microphones is placed within the signature sensing chamber;
   m. an irritant;
      wherein the irritant is located within the signature sensing chamber;
   n. a fan;
      wherein the fan is located within the enclosed trap structure;
   o. a chamber screen;
      wherein the chamber screen is placed in an interior of the signature sensing chamber;
   p. an exit detector;
      wherein the exit detector is located within the enclosed trap structure;
   q. a micro-controller;
      wherein the micro-controller operates the mosquito trap.

2. The mosquito trap as described in claim 1 wherein the first channel and second channels are different lengths.

3. The mosquito trap as described in claim 1 wherein the attractant is placed at the opening of the first channel.

4. The mosquito trap as described in claim 1 wherein the attractant is placed at the opening of the second channel.

5. The mosquito trap as described in claim 1 wherein the irritant is heat.

6. The mosquito trap as described in claim 1 wherein the irritant is a physical strike.

7. The mosquito trap as described in claim 1 wherein the irritant is noise.

8. The mosquito trap as described in claim 1 wherein the irritant is vibration.

9. The mosquito trap as described in claim 1 wherein the plurality of light detectors are located directly across the signature sensing chamber from the plurality of light emitters.

10. The mosquito trap as described in claim 1 wherein the light guide with the light detectors are located directly across the signature sensing chamber from the plurality of light emitters.

11. The mosquito trap as described in claim 10 wherein the light guide comprises a polarizing lens.

12. A mosquito trap which is comprised of:
    a. an enclosed structure with a bottom;
    b. an attractant;
    c. a first channel;
       wherein the first channel extends a predetermined length from the bottom of the enclosed structure;
       wherein an opening is provided on the end of the first channel;
    d. a second channel;
       wherein the second channel extends a predetermined length from the bottom of the enclosed structure;
       wherein an opening is provided on the end of the second channel;
    e. an entrance detector for the first channel;
    f. an entrance detector for the second channel;
    g. an interior channel;
       wherein the interior channel permits movement of a mosquito within the enclosed structure from at least one of the first channel and the second channel;
    h. a signature sensing chamber;
       wherein the signature sensing chamber has a predetermined shape and an interior:
    i. an entrance door;
       wherein the entrance door permits access to the signature sensing chamber from the interior channel;
    j. a plurality of light emitters;
       wherein the plurality of light emitters is affixed to an inner perimeter of the signature sensing chamber;

wherein the light from the light emitters are passed through a light guide or a diffuser;
k. a plurality of light detectors;
wherein the plurality of light detectors is affixed to the inner perimeter of the signature sensing chamber;
wherein the plurality of light detectors is located directly across the signature sensing chamber from the plurality of light emitters;
l. a plurality of microphones;
wherein the plurality of microphones detect a wing beat frequency;
wherein the plurality of microphones is placed within the signature sensing chamber;
m. an irritant;
wherein the irritant is located within the signature sensing chamber;
n. a fan;
wherein the fan is located within the enclosed trap structure;
o. a rotatable screen;
wherein the rotatable screen is placed in the interior of the signature sensing chamber;
wherein the rotatable screen provides an exit point for the mosquito from the signature sensing chamber;
p. an exit detector;
wherein the exit detector is located within the enclosed trap structure;
q. a micro-controller;
wherein the micro-controller operates the mosquito trap.

13. The mosquito trap as described in claim 12 wherein the first channel and second channels are different lengths.

14. The mosquito trap as described in claim 12 wherein the attractant is placed at the opening of the first channel.

15. The mosquito trap as described in claim 12 wherein the attractant is placed at the opening of the second channel.

16. The mosquito trap as described in claim 12 wherein the irritant is heat.

17. The mosquito trap as described in claim 12 wherein the irritant is a physical strike.

18. The mosquito trap as described in claim 12 wherein the irritant is noise.

19. The mosquito trap as described in claim 12 wherein the irritant is vibration.

20. The mosquito trap as described in claim 12 wherein the light guide is located directly across from the plurality of light emitters which directs the light onto the plurality of light detectors.

21. The mosquito trap as described in claim 20 wherein the light guide comprises a polarizing lens.

22. A method to use the mosquito trap as described in claim 1, which is comprised of the following steps:
a. placing the trap in an area;
b. placing the attractant in close proximity to the opening of the first channel;
c. placing the attractant in close proximity to the opening of the second channel;
d. turning on the fan to create a vaccum;
e. drawing the mosquito into the signature sensing chamber with the vacuum through at least one of the first channel and the second channel, the interior channel, and a first opening of the pair of openings provided on the perimeter of the signature sensing chamber and;
f. turning the fan off;
g. identifying the mosquito;
h. turning the fan on;
i. applying the irritant to the mosquito;
j. aligning a second opening of the pair of openings with an exit from the signature sensing chamber that is located within the enclosed structure by rotating the signature sensing chamber to allow the mosquito to exit the signature sensing chamber through the second opening of the pair of openings and the exit from the signature sensing chamber;
k. detecting the exit of the mosquito as it exits the signature sensing chamber with the exit detector;
l. collecting the mosquito in a catch bag attached to the enclosed structure.

23. The method as described in claim 22 wherein the step of indentifying of the mosquito is through the wingbeat frequency thereof detected by at least one of the plurality of light detectors and the plurality of microphones.

24. The method as described in claim 22 wherein the step of identifying the mosquito is through noise detection by the plurality of microphones.

* * * * *